United States Patent [19]

Revelin

[11] Patent Number: 4,539,599
[45] Date of Patent: Sep. 3, 1985

[54] ASSEMBLY FIXTURE FOR TELEVISION SETS

[76] Inventor: Bernard Revelin, Le Bois Randenais, Brugheas 03700 Bellervie sur Allier, France

[21] Appl. No.: 386,718

[22] Filed: Jun. 9, 1982

[51] Int. Cl.³ ............................................. H04N 5/64
[52] U.S. Cl. .................................... 358/254; 312/7.2
[58] Field of Search ................ 358/245, 254; 312/7.2; D14/77, 78

[56] References Cited

U.S. PATENT DOCUMENTS

| | | | |
|---|---|---|---|
| 2,806,754 | 9/1957 | Abeles et al. | 312/7.2 |
| 3,086,078 | 4/1963 | Sharma | 358/254 |
| 3,194,619 | 7/1965 | Dannenberg | 312/7.2 |
| 3,493,281 | 2/1970 | Kile | 312/257 |
| 4,002,831 | 1/1977 | Aeschliman | 358/254 |

FOREIGN PATENT DOCUMENTS 1489194  6/1967  France ............................... 358/254

Primary Examiner—John C. Martin
Assistant Examiner—Edward L. Coles
Attorney, Agent, or Firm—Lee C. Robinson, Jr.

[57] ABSTRACT

An assembly fixture for television sets consists of a top panel, a front panel secured to the top panel, and a pair of opposite side panels, each of the latter being secured to both the top and front panels, respectively. The assembly fixture, when used with a television set, is placed over that television set to encompass same, and the front panel has a main aperture therein through which the picture screen of the television set is viewed.

8 Claims, 2 Drawing Figures

ASSEMBLY FIXTURE FOR TELEVISION SETS

BACKGROUND OF THE INVENTION

This invention relates to an assembly fixture for television sets and, more particularly, to such an assembly fixture which may be placed over an existing television set in, for example, the user's home, and thereby transform the outward appearance of that television set so as to be consonant with the furnishings of the room in which that television set is located.

Television sets now have become so commonplace that they are found in the majority of homes. In general, television sets are produced in accordance with typical mass production, assembly-line techniques and, in the interest of production and cost efficiency, many television sets have become standardized. Essentially, most television sets now appear merely as a "box" having a viewing screen, operator control elements and a suitable grill network for the loudspeaker. Even the relative locations of the foregoing components have become practically standardized; although some manufacturers locate the control elements either on the front plane or the top or side planes of the television "box".

The plain, standardized outward appearance of the typical television set may not conform to the particular furnishings in the room in which it is disposed. However, heretofore, the user of a television set was limited to the appearance thereof as a function of the "furniture" models that various manufacturers offer for sale. Consequently, if the user's furnishings differ greatly from the style of furniture offered by the television set manufacturer, the user generally has been compelled to purchase a model having the simplest appearance. Unfortunately, even a simplistic design of the television set may be in sharp contrast with antique or rustic furnishings with which the user may have decorated the room in which that television set is located. Such sharp contrasts often are undesirable; but, heretofore, the user has had very little, if any, alternative in harmonizing the appearance of his television set with that of its surrounding environment.

OBJECTS OF THE INVENTION

Therefore, it is an object of the present invention to provide an assembly fixture for television sets which overcomes the aforenoted shortcomings.

Another object of this invention is to provide an assembly fixture of the aforementioned type which the user may place over his existing television set and thereby transform the outward appearance of that television set to one which is consonant with the surrounding decorations and furnishings of the environment in which that television set is located.

A further object of this invention is to provide an assembly fixture for television sets which, when used with an existing, on-site television set, transforms the outward design appearance thereof so as to harmonize the style of the television set with the furnishings of the room in which it is located.

An additional object of this invention is to provide an assembly fixture for television sets consisting essentially of a number of panels which form a partial housing, the panels having an appearance of furniture which may be in better harmony with the furnishings of the room in which that television set is located.

Various other objects, advantages and features of the present invention will become readily apparent from the ensuing detailed descriptions, and the novel features will be particularly pointed out in the appended claims.

SUMMARY OF THE INVENTION

In accordance with this invention, an assembly fixture for television sets is provided. This fixture consists of a top panel, a front panel secured to the top panel, and a pair of opposite side panels each of which is secured to both the top and front panels, respectively. The assembly fixture, in use, is placed over an existing, on-site television set to encompass the latter. The front panel is provided with a main aperture therein through which the picture screen of the television set is viewed.

In accordance with an aspect of this invention, at least the front panel and, if desired, one or more of the additional panels, may be provided with a decorative motif which is consonant with the surroundings of the room in which the television set is located. In this regard, various panels of standardized dimensions may be provided, each of such panels being manufactured in various different decorative motifs so that the user may select those panels which he desires, easily assemble the fixture, and then place that fixture over his television set.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
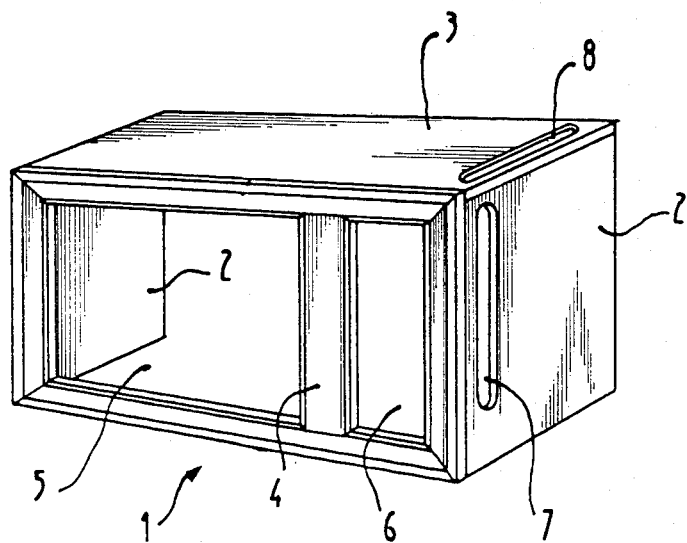
FIG. 1 is a perspective view of the assembly fixture in accordance with the present invention.

Referring now to the drawings, it is seen that the present invention is comprised of an assembly fixture. This assembly fixture is provided with a pair of side panels 2, a top panel 3 and a front panel 4. The panels, when assembled, form a four-sided housing of substantially parallelpiped shape. The bottom and rear of the housing, as viewed in FIG. 1, are open to permit assembly fixture 1 to be placed over a television set and thereby encompass same. It is appreciated that the internal dimensions of the respective panels are such that, when assembled, the assembly fixture fits easily over a television set. Of course, since television sets are manufactured in different sizes, the respective panels may be produced in, for example, a number (such as 3, 4 or 5) of different sizes, thereby best accommodating such different television sets.

Figure 2:
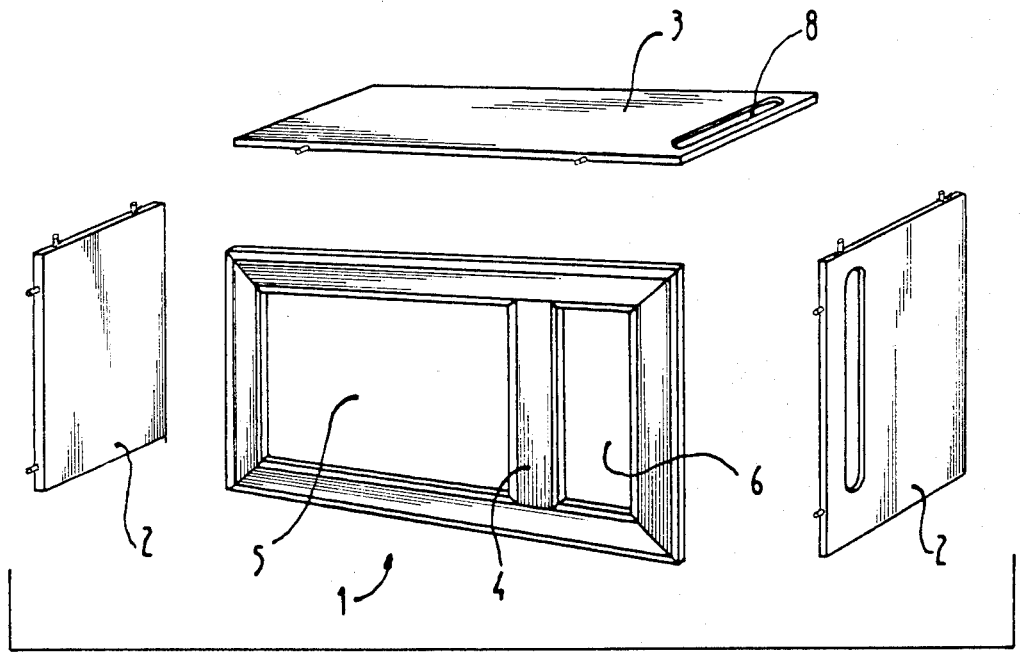
FIG. 2 is an exploded view of the assembly fixture illustrating the manner in which the fixture may be readily assembled.

The panels may be assembled by conventional dowel and socket arrangement, as illustrated in FIG. 2. Alternatively, more permanent fastening elements may be used.

Front panel 4 is provided with a main aperture 5 which is adpated to be in registration with the usual picture screen of the television set housed within assembly fixture 1. For television sets of different sizes, not only may the panels be of correspondingly different dimensions but aperture 5 likewise may be of a different size, or area, so as to properly accommodate the television screens of such television sets.

It has been found that, when assembly fixture 1 is placed over a television set so as to encompass the same, the assembly fixture extends outwardly beyond the front surface, or face, of the television set thereby effectively "deepening" the perceived sense of the viewed television picture. This enhancement appears as an improved relief effect, and is believed to be attributed to the fact that the front surface of assembly fixture 1 projects outwardly from the television screen.

As also shown in FIGS. 1 and 2, front panel 4 may be provided with a further aperture 6 therein, this aperture being spaced from main aperture 5 by an upright section of the front panel. The purpose of further aperture 6 is to provide access to the usual control elements, such as channel-selector means, fine tuning controls, and the usual horizontal, vertical, brightness, contrast and color adjustment controls, which may be provided on the front face of the television set. Alternatively, if the aforementioned control elements are provided on the side or top surfaces of the television set, a side panel 2 may be provided with a suitable further aperture 7 to provide access thereto or, alternatively, top panel 3 may be provided with such a further aperture 8. As a further alternative, the various apertures 6, 7 and 8 may be pre-formed in the panels, but may be filled with the score lines thereof being consistent with the decorative appearance of assembly fixture 1. Depending upon the particular location of the television set control elements, the user may remove one of these fill-in elements, thereby resulting in a corresponding aperture through which access may be had to such television set control elements.

Concourse, front panel 4 is not visible when assembly fixture 1 is placed over the television set. Accordingly, the front panel desirably is provided with a decorative motif which is consonant with the furnishings of the environment in which the television set is located. For example, interchangeable front panels 4 may be available for selection by the user, such front panels having antique, rustic, contemporary, etc. decorative motifs. Depending upon the furnishings of the room in which the television set is located, the user may select the front panel having the desired decorative motif, and this front panel then may be assembled with the top and side panels so as to form assembly fixture 1.

Similarly, side panels 2 and/or top panel 3 also may exhibit a desirable decorative motif. Here too, different, interchangeable panels may be available for selection by the user, each such panel having a desired decorative motif so that, when assembled with the remaining panels, a desired furniture appearance of assembly fixture 1 is provided.

As examples, the various panels may be provided with scallops, volutes, colonnettes, or any other desired decorative motif.

Various modifications of the basic assembly fixture illustrated in FIGS. 1 and 2 are contemplated by the present invention. For example, front panel 4 may be provided with one or more sliding doors adapted to close apertures 5 and 6 so as to conceal the television picture screen, control elements and loudspeaker, as desired. Also, depending upon the particular location of the loudspeaker of the television set, the panel of assembly fixture 1 adjacent that loudspeaker may be provided with a grillwork, cloth screen or other conventional element which serves to conceal the visual appearance of the loudspeaker but permits sound which emanates from the loudspeaker to be transmitted therethrough.

Since assembly fixture 1 is adapted to be placed over the television set, and since the interior dimensions of the assembly fixture generally may be selected so as to exceed the external dimensions of the television set housed therewithin, it is appreciated that sufficient ventilation is provided in the interior of the assembly fixture such that heat which is generated from the television set may be dissipated easily. Moreover, even after the illustrated fixture is assembled, one or more of the panels may be replaced with a panel of substantially identical dimensions but different decorative motif so as to change the appearance thereof in the event that the furnishings of the room in which the television set is located are changed.

Panels 2, 3 and 4 may be constructed of any desired material but, advantageously, such panels are formed of wood. This wood may be natural, dyed, painted, varnished or otherwise treated so as to have a veneer of desirable appearance.

While the present invention has been particularly shown and described with reference to a preferred embodiment, it should be readily appreciated by those of ordinary skill in the art that various changes and modifications in form and details may be made without departing from the spirit and scope of the invention. It is, therefore, intended that the appended claims be interpreted as including all such changes and modifications.

What is claimed is:

1. An assembly fixture for partially enclosing the cabinet of a television set, the fixture comprising a panel assembly having only a top panel, a front panel detachably secured to the top panel, and a pair of opposite side panels, each of the latter being detachably secured to both the top and front panels, respectively, the assembly fixture, in use, being placed over the cabinet of the television set to encompass the cabinet, and the front panel obscuring the front face of the cabinet and having a main aperture therein through which the picture screen of the television set is viewed, at least one of the panels having score lines defining a further aperture aligned with the control elements normally provided on the television set to provide access therethrough to permit a user to adjust the control elements.

2. The assembly of claim 1 wherein said further aperture is provided in said front panel.

3. The assembly of claim 2 wherein said further aperture is spaced from said main aperture by an upright section of said front panel.

4. The assembly of claim 1 wherein said further aperture is provided in one of said side panels.

5. The assembly of claim 1 wherein said further aperture is provided in said top panel.

6. The assembly of claims 1, 2, 3, 4 or 5 wherein at least the front panel exhibits a decorative motif.

7. The assembly of claim 6 wherein the remaining panels exhibit a decorative motif.

8. As assembly fixture for partially enclosing the cabinet of a television set, the fixture comprising a panel assembly consisting of only a top panel, a front panel detachably secured to the top panel, and a pair of opposite side panels, each of the latter being detachably secured to both the top and front panels, respectively, the assembly fixture, in use, being placed over the cabinet of the television set and being of a size such that the fixture extends outwardly beyond the front face of the cabinet, and the front panel obscuring the front face of the cabinet and having a main aperture therein through which the picture screen of the television set is viewed, at least one of the panels having score lines defining a further aperture aligned with the control elements normally provided on the television set to provide access therethrough to permit to user to adjust the control elements.

* * * * *